Feb. 5, 1946. W. S. PIERCE, JR 2,394,475
FINISHING GAUGE
Filed June 24, 1944  2 Sheets-Sheet 2
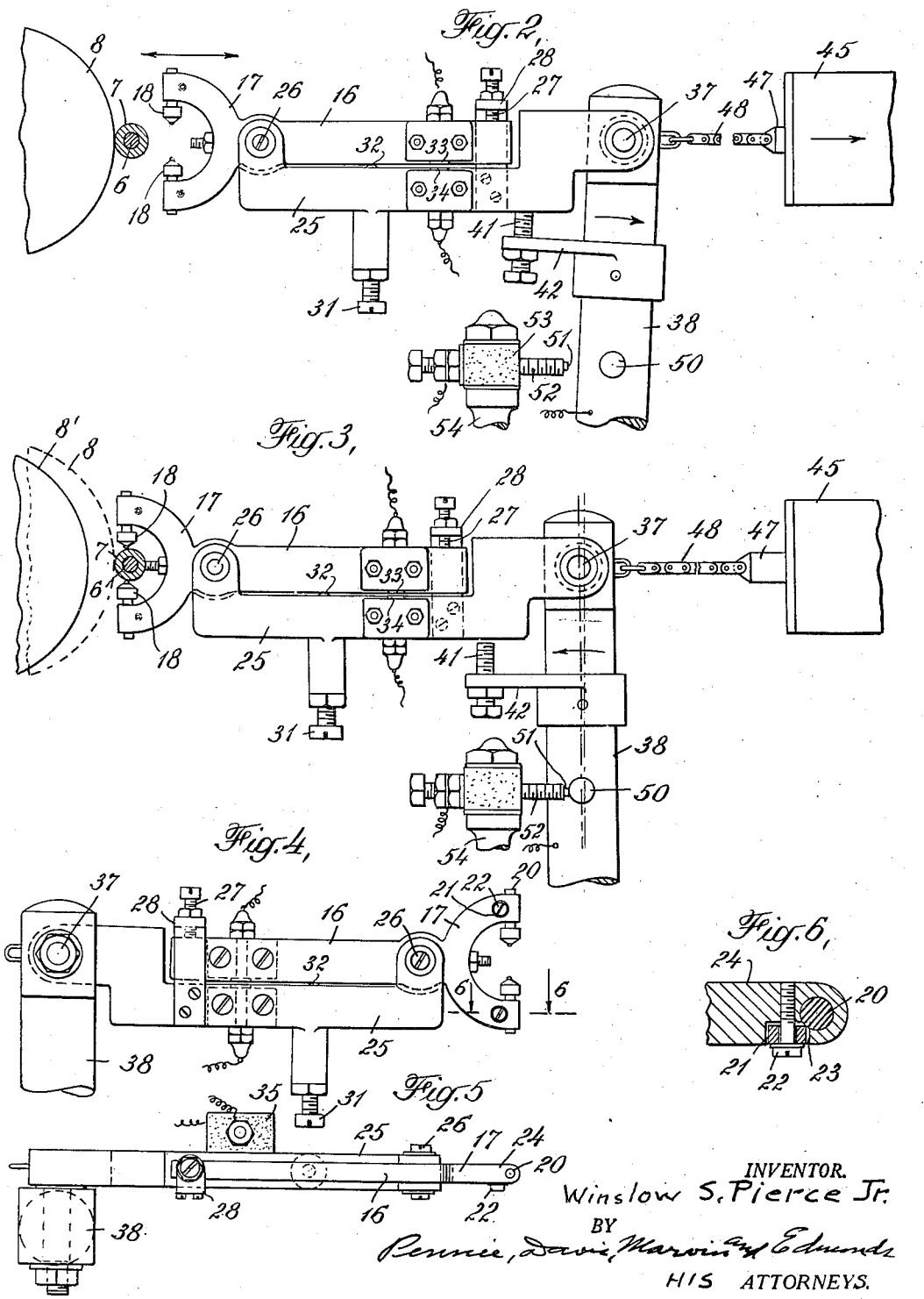
INVENTOR.
Winslow S. Pierce Jr.
BY
Pennie, Davis, Marvin & Edmonds
HIS ATTORNEYS.

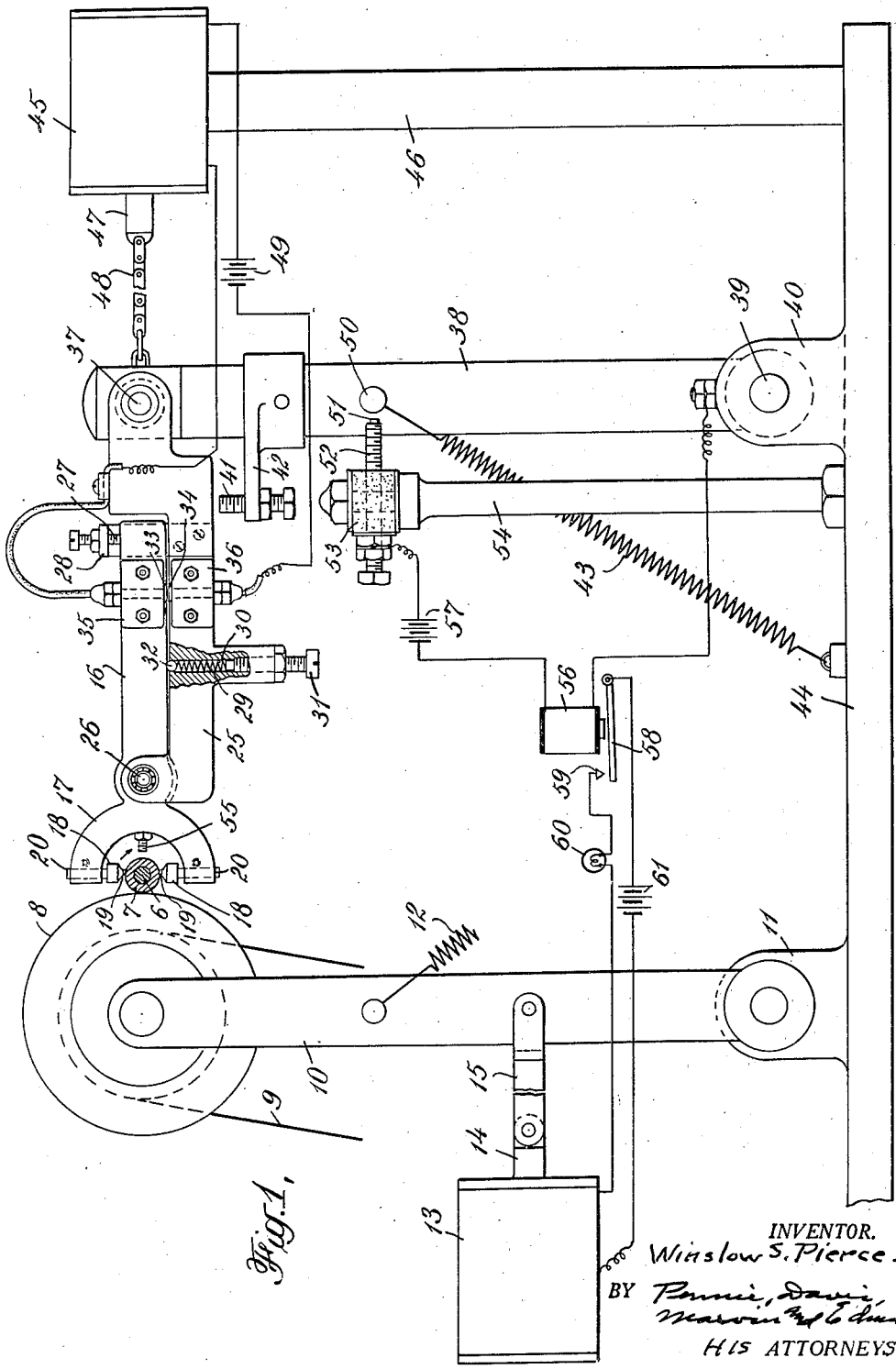

Patented Feb. 5, 1946

2,394,475

UNITED STATES PATENT OFFICE 2,394,475

FINISHING GAUGE

Winslow S. Pierce, Jr., Dublin, N. H., assignor to Miniature Precision Bearings, Keene, N. H., an unincorporated partnership consisting of Winslow S. Pierce, Jr., Dublin, and Arthur N. Daniels, Hancock, N. H.

Application June 24, 1944, Serial No. 541,944

14 Claims. (Cl. 51—165)

This invention relates to finishing gauges and more particularly concerns improved mechanism for calipering or measuring the diameter of a circular section part while the same is being ground or otherwise finished to a desired size, and for automatically discontinuing the grinding or other finishing operation when the part is finished to the desired size.

Many circular section parts must be finished to highly precise and accurate dimensions and such finishing is customarily accomplished by grinding the part while rotating it between centers. The diameter to which the part is finished can be determined by periodically discontinuing both the grinding and the rotation of the part, and measuring the diameter of the part with a caliper, a micrometer gauge or a like measuring instrument. This procedure not only delays production but is fundamentally incapable of insuring that the part is finished to the desired diametral dimension. Thus if upon measurement the operator finds the part too large, he must continue grinding for an interval determined solely by his judgment. If the interval is too long, the part is ground down below the desired diameter, and in any case, grinding to size involves an element of chance or guess work that precludes consistent accuracy. Manual measurement while the work is being rotated and ground is unsatisfactory. As the part approaches the size for which the caliper or gauge is set, the points of the instrument bind on the part and the gauge is suddenly turned with the part which precludes accurate measurement.

With the above considerations in mind, it is proposed in accordance with the present invention to provide mechanism in the nature of a caliper which will effectively and continuously measure the diameter of a circular section part while the part is rotated and finished. More particularly, it is proposed to provide mechanism of this type which measures the diameter of the part right up to the point when the part is finished to the desired size, and at that point, either actuates a signal to indicate completion of the finishing operation or automatically discontinues the grinding of the part or performs both these functions. Other specific objects, advantages and characteristic features of the invention will be pointed out or will become apparent as the description thereof progresses.

In general, the objects of the invention are carried out by providing a gauge arm carrying a pair of oppositely disposed caliper points or equivalent means that can be set to the required dimension, and so mounting and supporting the arm that it can be moved laterally toward and away from the rotating part to be finished, and can also turn through a limited arc about a pivot parallel to the axis of the part. Means are provided for biasing the gauge arm toward the rotary part so that the caliper points are brought to bear on the part as it rotates. When the part is ground or finished to a diameter close to but greater than that for which the gauge is set, the grip of the caliper points on the part increases to the extent that the gauge arm is turned about its pivot in the direction in which the part rotates. This turning movement closes contacts or actuates other means which temporarily retracts the gauge arm from the part and so prevents injury to the part, the caliper points or the gauge mechanism due to excessive binding of the points on the rotary part. As soon as the caliper points are withdrawn from the part, the gauge arm is turned about its pivot in the opposite direction by suitable biasing means, thereby releasing the retracting mechanism and permitting the gauge arm to move back with the points in contact with the part again. The caliper points thus repeatedly oscillate into and out of contact with the rotating part until the part is finished exactly to the size for which the points are set, whereupon the points pass beyond the center of the part. This movement of the points actuates means which either signals the operator that the part is finished or terminates the finishing operation or performs both these functions.

In describing the invention in detail, reference will be made to the accompanying drawings in which an embodiment thereof has been illustrated. In the drawings:

Fig. 1 is a diagrammatic and simplified front elevation of mechanism embodying the invention;

Figs. 2 and 3 are elevations of a part of the mechanism of Fig. 1 in different operating positions;

Fig. 4 is a rear elevation of the gauge arm and its support;

Fig. 5 is a plan view of the mechanism shown in Fig. 4; and

Fig. 6 is a sectional view on an enlarged scale, taken along the line 6—6 of Fig. 4 and viewed in the direction of the arrows.

Referring to the drawings and particularly to Fig. 1, my improved gauge mechanism has been illustrated in connection with a circular section part 7 carried on a mandrel 6 and rotated in the direction of the arrow by suitable known means. The part 7 may comprise a bearing race or any other part of circular section which is to be accurately ground or finished to a specified diameter. By way of example, I have shown a rotary grinding wheel 8, driven by suitable means through a belt 9 and mounted on a frame 10 pivotally connected to a fixed support 11. Suitable means are provided for feeding the wheel 8 against the part 7. In conventional machines, a positive mechanical feed is used for this purpose. To simplify the disclosure, I have shown a spring 12 for feeding the wheel 8, but it should be understood that any other known feed may be used. Means are provided for retracting the grinding wheel 8 from the part 7 to terminate the finishing operation. This has been illustrated as a solenoid 13 acting through an armature 14 and a link 15 connected to the frame 10. In the illustrated embodiment, the gauge mechanism includes a gauge arm 16 having a yoke 17 at one end thereof, the respective arms of which carry oppositely disposed spaced caliper points 18. The ends of the points 18 are rounded and formed of hard material. Rounded diamond point tips 19 may be employed for this purpose. The shanks 20 of the points 18 are adjustably secured to the ends of the yoke 17 so that the interval between the points may be set to the diameter to which the part 7 is to be finished. As shown in Figs. 4 and 6, each point shank 20 may be releasably clamped in place by a washer 21 forced by a screw 22 against the shank 20 in a side opening 23 in the yoke end 24, which side opening intercepts the opening through which the shank 20 passes.

The gauge arm 16 is connected to a gauge arm support 25 by a pivot 26, and the axis of the pivot extends normal to a plane through the points 18 and thus substantially parallel to and adjacent the axis about which the part 7 to be calipered turns. A stop in the form of a set screw 27, threaded in a bracket 28 fixed to the support 25 limits the movement of the gauge arm 16 about the pivot 26 to a small arc. The gauge arm 16 is biased in a direction to engage the stop screw 27 by suitable means illustrated as a coiled spring 29 carried in an opening 30 through the support 25 and compressed by a screw 31. A ball 32 may be inserted between the end of the spring 29 and the under face of the gauge arm 16, as shown in Fig. 1.

Two cooperating electrical contacts 33 and 34 are respectively fixed to the gauge arm 16 and the support 25 by insulating blocks 35 and 36. These contacts are separated when the gauge arm 16 is biased against the stop screw 27 as shown in Fig. 1, and are closed when the gauge arm 16 is turned about its pivot 26 in a clockwise direction as viewed in that figure. It should be noted that the direction of movement of the gauge arm 16 about its pivot 26 in closing the contacts 33 and 34 is the same as the direction of rotation of part 7 being finished.

The support 25 is so mounted as to be movable laterally toward and away from the rotating part 7. In the illustrated embodiment, the outer end of the arm 25 is pivotally connected at 37 to a vertically extending post 38 which in turn is pivotally connected at 39 to a fixed support 40. A stop in the form of a screw 41 carried by a bracket 42 fixed to the post 38 limits downward movement of the support 25 (see Fig. 2). Suitable means such as a tensioned spring 43 connected between the post 38 and the fixed base 44 biases the post and the gauge mechanism carried thereby toward the part 7.

Suitable means are provided for retracting the support 25 and gauge arm 16 away from the part 7 when the contacts 33 and 34 are closed. In the disclosed embodiment, a fixed solenoid 45 carried by a bracket 46 is provided with an armature 47 connected to the post 38 by suitable means such as a chain 48. The solenoid 45 is connected in a circuit including in series the contacts 33 and 34 and a source of electrical energy illustrated by the battery 49 as shown in Fig. 1.

In accordance with one aspect of my invention, means are provided for signalling the operator and discontinuing the finishing operation when movement of the caliper points 18 beyond the center of the rotating part 7 indicates that the part has been finished to the desired diameter. In the illustrated embodiment, a laterally extending electrical contact 50 on the post 38 cooperates with an adjustable fixed contact 51 at the end of a screw 52 threaded in an insulating block 53. The block 53 is carried by a post 54 secured to the base 44. An adjustable stop 55 on the yoke 17 of the gauge arm 16 engages the part 7 and so limits the movement of the arm 16 toward the part when the points 18 pass beyond the center of the part. The interval between the contacts 50 and 51 is so adjusted as to be closed when the points 18 pass beyond the center of the part 7. The contacts 50 and 51 are connected in an electrical circuit including a relay 56 and a source of energy represented by the battery 57. The movable and fixed contacts 58 and 59 of the relay 56 are connected in series in an electrical circuit including a signal lamp 60, the wheel retracting solenoid 13 and a source of energy represented by the battery 61.

The operation of the disclosed embodiment of my invention will now be described. The points 18 are set to be separated by an interval equal to the desired diameter of the part to be finished. The part 7, which initially has a diameter somewhat larger than that desired, is rotated in the direction of the arrow on the mandrel 6, and the rotating grinding wheel 8 is brought in contact therewith. It will be understood that the wheel 8 may be reciprocated axially along the part 7 in accordance with known practice. When the grinding starts, the caliper points 18 rest on the circumference of the part 7 as shown in Fig. 1, being lightly pressed into engagement therewith by the spring 43. In this position, the support 25 is lifted off the stop screw 41 so that the caliper points 18 ride freely on the part 7.

At the start of the grinding operation, the friction between the points 18 and the part 7 is insufficient to impart enough torque to the gauge arm 16 to overcome the bias of the spring 29, and the contacts 33 and 34 remain open. As part 7 is ground down to a diameter close to that for which the caliper points 18 are set, the points grip the part more firmly, and finally sufficient torque is frictionally transmitted from the part 7 to the arm 16 to turn the arm about the pivot 26 and close the contacts 33 and 34. The turning of the arm is accompanied by a downward movement of the pivot 26, the support 25 swinging downwardly slightly about the pivot 37. Closure of the contacts 33 and 34 energizes the solenoid 45 and retracts the caliper points 18 from the part 7 (Fig. 2). As the mechanism is retracted, the support 25 is carried by the stop screw 41. As soon as the points 18 disengage the part 7, the spring 29 opens the contacts 33 and 34, de-energizing the solenoid 45 and the spring 43 advances the mechanism until the caliper points 18 again engage the part 7. The mechanism continues to oscillate the points 18 out of and into contact with the part 7 in the manner described as the part approaches the desired diameter, and injurious gripping of the part 7 between the points 18 is prevented by the periodic retracting of the points from the part. When the part 7 is ground to the exact dimension desired, the points 18 pass beyond the center of the part as shown in Fig. 3 and the contact 50 engages the contact 51. This energizes the relay 56, closes its contacts 58 and 59 and thus energizes the solenoid 13, retracting the grinding wheel 8 from the part 7 and so terminating the finishing operation. At the same time, the signal lamp 60 is energized, indicating to the operator that the part is finished to the desired diameter. The gauge mechanism is then manually retracted, the finished part is removed and replaced by an unfinished part and the operation is repeated.

The tension of the spring 43 and the compression of the spring 29 are suitably adjusted so that the gauge mechanism will start its oscillatory motion before gripping of the caliper points 18 on the part 7 reaches a degree at which the part or the gauge mechanism might be injured. An increase in the tension of the spring 43 causes earlier closing of the contacts 33 and 34, and an increase in the compression of the spring 29 causes later closing of these contacts. The adjustments are not critical and are readily made by a brief trial.

My improved gauge mechanism controls the finishing operation with a high degree of precision, avoids interrupting the grinding operation and eliminates all guess work and errors in judgment on the part of the operator.

I claim:

1. Mechanism of the character described comprising a pivotally mounted member, a gauge arm support pivotally connected to said member, an elongated gauge arm carrying a pair of spaced oppositely disposed caliper points at one end thereof, means pivotally connecting said gauge arm to said support along an axis normal to a plane extending longitudinally of said gauge arm and passing through said points, means for biasing said pivotally mounted member to advance said gauge arm points and means responsive to turning of said gauge arm about said pivotal connection relative to said support for retracting said pivotally mounted member against the action of said biasing means.

2. Mechanism of the character described comprising a movable gauge arm carrying a pair of spaced oppositely disposed caliper points for engaging a rotating circular section part to be calipered, a pivot supporting said gauge arm, means responsive to turning motion of said gauge arm about said pivot caused by the engagement of said points with such a part for moving said gauge arm to retract said points out of contact with such part, and means for moving said gauge arm to advance said points into contact with such a part when no turning motion is imparted thereto by such a part.

3. Mechanism of the character described comprising a retractable wheel for finishing a rotating circular part, a movable gauge arm carrying a pair of spaced oppositely disposed caliper points for engaging such a part, a pivot supporting said gauge arm, means responsive to turning motion of said gauge arm about said pivot caused by engagement of said points with such a part for moving said gauge arm to retract said points out of contact with such a part, means for moving said gauge arm to advance said points into contact with such a part when no turning motion is imparted thereto by such a part, and means responsive to movement of said points beyond the center of such a part for retracting said wheel.

4. In mechanism of the character described, in combination, an elongated gauge arm carrying a pair of oppositely disposed spaced caliper points adjacent one end thereof, a gauge arm support, means for pivotally connecting said gauge arm to said support on an axis normal to a plane extending longitudinally of said gauge arm and passing through said caliper points, means for movably supporting said gauge arm support to permit movement of said pivotal connection in response to turning movement of said gauge arm, means for movably mounting said gauge arm support to advance and retract said gauge arm longitudinally, and means responsive to turning movement of said gauge arm about said pivotal connection for moving said support to retract said gauge arm.

5. In mechanism of the character described, in combination, an elongated gauge arm carrying a pair of oppositely disposed spaced caliper points adjacent one end thereof, a gauge arm support, means for pivotally connecting said gauge arm to said support on an axis normal to a plane extending longitudinally of said gauge arm and passing through said caliper points, means for movably supporting said gauge arm support to permit movement of said pivotal connection in response to turning movement of said gauge arm, means for mounting said gauge arm support to move said gauge arm longitudinally whereby said caliper points may be advanced and retracted, means for biasing said support to move in a direction to advance said points, and means responsive to turning movement of said gauge arm about said pivotal connection for temporarily moving said support in a direction to retract said points.

6. In mechanism of the character described, in combination, an elongated gauge arm carrying a pair of oppositely disposed spaced caliper points adjacent one end thereof, a gauge arm support, means for pivotally connecting said gauge arm to said support on an axis normal to a plane extending longitudinally of said gauge arm and passing through said caliper points, means for biasing said gauge arm to turn about said pivotal connection in one direction, means for movably supporting said gauge arm support to permit movement of said pivotal connection in response to turning movement of said gauge arm, means for movably mounting said gauge arm support to move said gauge arm longitudinally whereby said caliper points may be advanced and retracted, means for biasing said gauge arm support to advance said points and means responsive to turning movement of said gauge arm about said pivotal connection against the action of said biasing means for temporarily moving said support to retract said points.

7. In mechanism of the character described, in combination, an elongated gauge arm carrying a pair of oppositely disposed spaced caliper points adjacent one end thereof for engaging a rotating circular section part to be calipered, means for finishing a part to be calipered, a gauge arm support, means for pivotally connecting said gauge arm to said support on an axis normal to a plane extending longitudinally of said gauge arm and passing through said caliper points, means for movably mounting said gauge arm support to permit movement of said pivotal connection in response to turning movement of said gauge arm, means for mounting said support to move said gauge arm longitudinally whereby said caliper points may be advanced and retracted, means for biasing said support to move in a direction to advance said points, means responsive to turning movement of said gauge arm about said pivotal connection for moving said support to retract said caliper points, and means responsive to a predetermined advance of said points for discontinuing the operation of said finishing means.

8. In mechanism of the character described, in combination, an elongated gauge arm carrying a pair of oppositely disposed spaced caliper points adjacent one end thereof for engaging a rotating circular section part to be calipered, finishing means movable to an operative position to finish a rotating part and retractable from such position to discontinue such finishing, a gauge arm support, means for pivotally connecting said gauge arm to said support on an axis normal to a plane extending longitudinally of said gauge arm and passing through said caliper points, means for biasing said gauge arm to turn in one direction about said pivotal connection, means for movably mounting said gauge arm support to permit movement of said pivotal connection in response to turning movement of said gauge arm, means for mounting said support to move said gauge arm longitudinally whereby said caliper points may be advanced and retracted, means for biasing said support to move in a direction to advance said points, means responsive to turning movement of said gauge arm about said pivotal connection against said gauge arm biasing means for moving said support to retract said caliper points and means responsive to a predetermined advance of said points for retracting said finishing means.

9. In mechanism of the character described, in combination, an elongated gauge arm carrying a pair of oppositely disposed spaced caliper points adjacent one end thereof for engaging a rotating circular part to be calipered, a gauge arm support, means for pivotally connecting said gauge arm to said support on an axis normal to a plane extending longitudinally of said gauge arm and passing through said caliper points, means for biasing said gauge arm to turn in one direction about said pivotal connection, means for movably mounting said gauge arm support to permit movement of said pivotal connection in response to turning movement of said gauge arm, means for mounting said support to move said gauge arm longitudinally whereby said caliper points may be advanced and retracted, means for biasing said support to move in a direction to advance said points, means responsive to turning movement of said gauge arm about said pivotal connection against said gauge arm biasing means for moving said support against said support biasing means and means responsive to a predetermined advance of said points for actuating a signal.

10. In mechanism of the character described, in combination, an elongated gauge arm carrying a pair of oppositely disposed spaced caliper points adjacent one end thereof for engaging a rotating circular section part to be calipered, finishing means movable to an operative position to finish a rotating part and retractable from such position to discontinue such finishing, a gauge arm support, means for pivotally connecting said gauge arm to said support on an axis normal to a plane extending longitudinally of said gauge arm and passing through said caliper points, means for biasing said gauge arm to turn in one direction about said pivotal connection, means for movably mounting said gauge arm support to permit movement of said pivotal connection in response to turning movement of said gauge arm, means for mounting said support to move said gauge arm longitudinally whereby said caliper points may be advanced and retracted, means for biasing said support to move in a direction to advance said points, means responsive to turning movement of said gauge arm about said pivotal connection against said gauge arm biasing means for moving said support to retract said caliper points and means responsive to a predetermined advance of said points for retracting said finishing means and actuating a signal.

11. In mechanism of the character described, in combination, an elongated gauge arm carrying a pair of oppositely disposed spaced caliper points adjacent one end thereof for engaging a rotating part to be calipered, a gauge arm support, means for pivotally connecting said gauge arm to said support on an axis normal to a plane extending longitudinally of said gauge arm and passing through said caliper points, means for biasing said gauge arm to turn in one direction about said pivotal connection, means for movably mounting said gauge arm support to permit movement of said pivotal connection in response to turning movement of said gauge arm, means for mounting said support to move said gauge arm longitudinally whereby said caliper points may be advanced and retracted, means for biasing said support to move in a direction to advance said caliper points, electric circuit controlling means closed by turning of said gauge arm about said pivotal connection in a direction opposing said gauge arm biasing means and opened by turning of said gauge arm in the opposite direction, and means operated in response to the closing of said circuit controlling means for moving said support against said support biasing means to retract said caliper points.

12. In mechanism of the character described, in combination, an elongated gauge arm carrying a pair of oppositely disposed spaced caliper points adjacent one end thereof for engaging a rotating part to be calipered, a gauge arm support, means for pivotally connecting said gauge arm to said support on an axis normal to a plane extending longitudinally of said gauge arm and passing through said caliper points, means for biasing said gauge arm to turn in one direction about said pivotal connection, means for movably mounting said gauge arm support to permit movement of said pivotal connection in response to turning movement of said gauge arm, means for mounting said support to move said gauge arm longitudinally whereby said caliper points may be advanced and retracted, means for biasing said support to move in a direction to advance said caliper points, electrical contacts on said gauge arm and said support opened when said gauge arm is turned by said biasing means and closed when said gauge arm is turned in the opposite direction, electrical means acting when energized to move said support to retract said caliper points, and an energizing circuit for said electrical means including said electrical contacts.

13. In mechanism of the character described, in combination, an elongated gauge arm carrying a pair of oppositely disposed spaced caliper points adjacent one end thereof for engaging a rotating part to be calipered, a gauge arm support, means for pivotally connecting said gauge arm to said support on an axis normal to a plane extending longitudinally of said gauge arm and passing through said caliper points, means for biasing said gauge arm to turn in one direction about said pivotal connection, means for movably mounting said gauge arm support to permit movement of said pivotal connection in response to turning movement of said gauge arm, means for mounting said support to move said gauge arm longitudinally whereby said caliper points may be advanced and retracted, means for biasing said support to move in a direction to advance said caliper points, finishing means movable to an operative position to finish a rotating part and retractable from such position to discontinue such finishing, a first pair of electrical contacts opened when said gauge arm is turned about said pivotal connection by said biasing means and closed when said gauge arm is turned in the opposite direction, a second pair of electrical contacts closed by a predetermined movement of said support by said support biasing means, means operated by the closing of said first pair of contacts for moving said support to retract said points and means operated by the closing of said second pair of contacts for retracting said finishing means.

14. In mechanism of the character described, in combination, an elongated gauge arm carrying a pair of oppositely disposed spaced caliper points adjacent one end thereof for engaging a rotating part to be calipered, a gauge arm support, means for pivotally connecting said gauge arm to said support on an axis normal to a plane extending longitudinally of said gauge arm and passing through said caliper points, means for biasing said gauge arm to turn in one direction about said pivotal connection, means for movably mounting said gauge arm support to permit movement of said pivotal connection in response to turning movement of said gauge arm, means for mounting said support to move said gauge arm longitudinally whereby said caliper points may be advanced and retracted, means for biasing said support to move in a direction to advance said caliper points, finishing means movable to an operative position to finish a rotating part and retractable from such position to discontinue such finishing, a pair of electrical contacts closed by turning of said gauge arm about said pivotal connection against said gauge arm biasing means, means operated by the closing of said pair of contacts for moving said support to retract said caliper points and means responsive to a predetermined movement of said support by said support biasing means for retracting said finishing means.

WINSLOW S. PIERCE, Jr.